A. J. PERRON.
PIE TRIMMER.
APPLICATION FILED DEC. 23, 1908.

941,337.

Patented Nov. 23, 1909.

Witnesses
J. L. Wright,
J. W. Garner

Inventor
Arthur J. Perron,
By Victor J. Evans,
Attorney

UNITED STATES PATENT OFFICE.

ARTHUR JOSEPH PERRON, OF LOWELL, MASSACHUSETTS.

PIE-TRIMMER.

941,337.

Specification of Letters Patent.

Patented Nov. 23, 1909.

Application filed December 23, 1908. Serial No. 468,962.

*To all whom it may concern:*

Be it known that I, ARTHUR J. PERRON, a citizen of the United States, residing at Lowell, in the county of Middlesex and State of Massachusetts, have invented new and useful Improvements in Pie-Trimmers, of which the following is a specification.

This invention is an improved pie trimmer for simultaneously trimming the edge of a pie on a pie tin and fluting or crimping the edge of the upper crust, the object of the invention being to produce a novel device of this character which may be readily and cheaply manufactured and which is extremely simple and easy to operate and greatly facilitates the trimming and fluting of pies.

Figure 1:
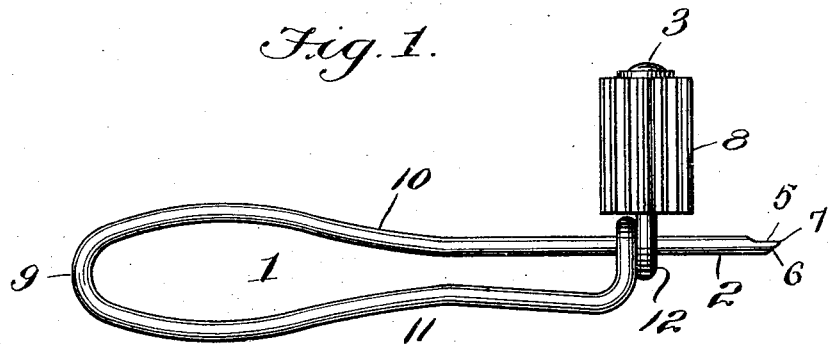
Figure 2:
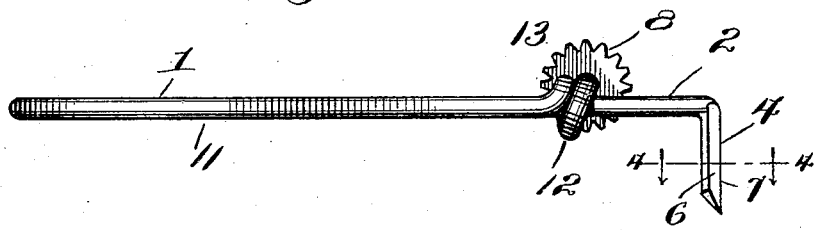
Figure 3:
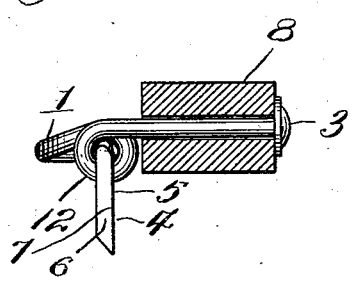
Figure 4:
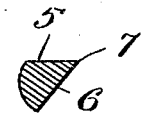

In the accompanying drawings:—Figure 1 is a plan of a pie trimmer constructed in accordance with this invention. Fig. 2 is an elevation of the same. Fig. 3 is an end elevation of the same, with the roller shown in section. Fig. 4 is a detail section of the cutter on the plane indicated by the line 4—4 of Fig. 2.

In the embodiment of my invention, I provide a handle 1 which has at its inner end a pair of arms 2—3, the former extending forwardly from and substantially parallel with the handle and the latter substantially at right angles to said arm 2. The arm 2 is provided at its outer end with a downwardly extending cutter 4 presenting a flattened side 5 to bear against the edge or flange of a pie tin and a beveled side 6 converging to the flattened side 5 to form a cutting edge 7. On the arm 3 is mounted a roller 8 to bear on the upper crust at the edge of the pie and to travel around the pie at the outer edge for the purpose of pressing the edge of the upper crust on the edge of the lower crust and also for the purpose of crimping, fluting or otherwise ornamenting the edge of the upper crust to give the pie a sightly appearance.

In the form of my invention here shown, the handle with its arms is formed of a single piece of steel or other suitable metallic rod of suitable gage. The said rod is bent at an intermediate portion as at 9 to form the sides 10, 11, of the handle, that portion of the rod which forms the side 11 being also bent to form a coil 12 around the side 10 serving to unite the sides 10 and 11, the terminal portion of the rod from which the side 11 is formed constituting the arm 3. The arm 2, as will be observed, is integral with the side portion 10 of the rod and the blade or cutter 4 is formed integrally with the said arm 2. Hence the handle with its integral arms and cutter may be exceedingly cheaply produced and moreover is exceedingly strong and durable. The periphery of the roller 8 which is mounted on the arm 3 is fluted as indicated at 13.

It will be understood from the foregoing description that in use the pie trimmer is disposed with the roller 8 bearing on the upper crust of a pie at the edge and with the cutter 4 bearing against the edge of the pie tin. The trimmer is then passed around the pie and tin, keeping the cutter in contact with the edge of the tin and the roller 8 bearing on the edge of the pie so that the said cutter serves to cut off the superfluous dough and to form the edge of the pie and the roller simultaneously serves to unite the upper and lower crusts at the edge and to also flute and otherwise ornament the edge of the upper crust.

What is claimed is:—

The hereindescribed pie trimmer comprising a rod doubled to form a handle the sides of which are spaced apart, one end of the rod extending in a right line with the handle, projecting forwardly therefrom and terminating in a downwardly bent portion beveled and sharpened to form a cutting edge, the other end of the rod being bent at right angles, provided with coils extending around the first-mentioned end portion and terminating in an arm extending at right angles to the first-mentioned end portion and handle and a roller mounted on said right-angled arm.

In testimony whereof I affix my signature in presence of two witnesses.

ARTHUR JOSEPH PERRON.

Witnesses:
 ARTHUR GRIMALD,
 NAPOLÉON CÔTÉ.